US012777273B2

(12) United States Patent
Tanaka et al.

(10) Patent No.: US 12,777,273 B2
(45) Date of Patent: Oct. 27, 2026

(54) SIGNAL TRANSMISSION SYSTEM AND SIGNAL TRANSMISSION METHOD

(71) Applicant: NTT, Inc., Tokyo (JP)

(72) Inventors: Yasunari Tanaka, Musashino (JP); Kazutaka Hara, Musashino (JP); Ryo Koma, Musashino (JP); Jin Uchiyama, Musashino (JP); Ryo Igarashi, Musashino (JP)

(73) Assignee: NTT, Inc., Tokyo (JP)

( * ) Notice: Subject to any disclaimer, the term of this patent is extended or adjusted under 35 U.S.C. 154(b) by 217 days.

(21) Appl. No.: 18/844,750

(22) PCT Filed: Mar. 11, 2022

(86) PCT No.: PCT/JP2022/011043

§ 371 (c)(1),
(2) Date: Sep. 6, 2024

(87) PCT Pub. No.: WO2023/170959

PCT Pub. Date: Sep. 14, 2023

(65) Prior Publication Data

US 2025/0211880 A1 Jun. 26, 2025

(51) Int. Cl.
*H04Q 11/00* (2006.01)
*H04B 10/27* (2013.01)

(52) U.S. Cl.
CPC ......... *H04Q 11/0005* (2013.01); *H04B 10/27* (2013.01)

(58) Field of Classification Search
CPC ............................ H04Q 11/0005; H04B 10/27
(Continued)

(56) References Cited

U.S. PATENT DOCUMENTS

| | | | | |
|---|---|---|---|---|
| 9,473,243 | B2 * | 10/2016 | Jiang | H04B 10/40 |
| 10,547,920 | B2 * | 1/2020 | Yang | G02B 6/35 |

(Continued)

FOREIGN PATENT DOCUMENTS

| | | | |
|---|---|---|---|
| JP | 2021197562 | A | 12/2021 |
| WO | WO-2021214996 | A1 | 10/2021 |

OTHER PUBLICATIONS

Mark Filer et al, "Low-margin optical networking at cloud scale", Journal of Optical Communications and Networking, vol. 11, No. 10, Oct. 2019.

*Primary Examiner* — Dalzid E Singh

(57) ABSTRACT

A signal transmission system that includes a plurality of transceivers that transmits and receives an optical signal, a gateway that receives the optical signal transmitted by the transceiver, performs optical-electrical conversion and electrical-optical conversion for the received optical signal, and outputs the converted optical signal, an optical switch, a transceiver control unit that controls an operation of the transceiver, and a management unit that determines the wavelength of the optical signal transmitted by the transceiver, in which the management unit determines the wavelength of the optical signal to be transmitted by a transmission-scheduled transceiver that is the transceiver scheduled to transmit the optical signal according to a predetermined rule in a case of acquiring transmission schedule notification information indicating the transmission-scheduled transceiver, and after the determination of the wavelength, the transceiver control unit causes the transmission-scheduled transceiver to transmit the optical signal of the determined wavelength.

8 Claims, 9 Drawing Sheets

(58) Field of Classification Search
USPC .............................................................. 398/45
See application file for complete search history.

(56) References Cited

U.S. PATENT DOCUMENTS

| | | | | |
|---|---|---|---|---|
| 2016/0269809 | A1* | 9/2016 | Jiang .................. | H04Q 11/0005 |
| 2020/0162186 | A1* | 5/2020 | Chen ................... | H04J 14/0216 |
| 2021/0184773 | A1* | 6/2021 | Park .................... | H04J 14/0258 |
| 2021/0385158 | A1 | 12/2021 | Hama et al. | |
| 2023/0170999 | A1* | 6/2023 | Kanai .................. | H04B 10/272 398/183 |

* cited by examiner

SIGNAL TRANSMISSION SYSTEM AND SIGNAL TRANSMISSION METHOD

CROSS-REFERENCE TO RELATED APPLICATIONS

This application is a 371 U.S. National Phase of International Application No. PCT/JP2022/011043, filed on Mar. 11, 2022. The entire disclosure of the above application is incorporated herein by reference.

TECHNICAL FIELD

The present invention relates to a signal transmission system and a signal transmission method.

BACKGROUND ART

There is a hyperscale data center network, which is a system in which a plurality of data centers (DCs) distributed over a wide area is connected as one huge DC via an aggregation switch.

CITATION LIST

Non Patent Literature

Non Patent Literature 1: Mark Filer, "Low-margin optical networking at cloud scale", Vol. 11, No. 10/October 2019/Journal of Optical Communications and Networking.

SUMMARY OF INVENTION

Technical Problem

However, in the hyperscale data center network proposed so far, routing processing at L2 may occur in communication in a regional network configuration using an intra-DC switch and an extra-DC connection switch (RNG). The routing processing at L2 has occurred in communication with an intra-DC switch on another ground via the nearest RNG or communication with another RNG.

The routing processing at L2 is processing executed by the RNG, and is processing of processing a packet, determining a route, and transmitting the packet to a destination. To process the packet, determine a path, and transmit the packet to a destination, the RNG requires conversion from an optical signal to an electrical signal and conversion from an electrical signal to an optical signal. Therefore, the DCNW proposed so far has a problem that power consumption is large.

Such circumstances are common not only to the hyperscale data center network but also to a signal transmission system including a device that performs conversion from an optical signal to an electrical signal and conversion from an electrical signal to an optical signal.

In view of the above circumstances, an object of the present invention is to provide a technique for suppressing an increase in power consumption required for signal transmission.

Solution to Problem

One aspect of the present invention is a signal transmission system including: a plurality of transceivers that transmits and receives an optical signal; a gateway that receives the optical signal transmitted by the transceiver, performs optical-electrical conversion and electrical-optical conversion for the received optical signal, and outputs the converted optical signal; an optical switch that includes a port connected to the transceiver and a port connected to the gateway, and outputs the optical signal to a port corresponding to a wavelength of the optical signal input to the port; a transceiver control unit that controls an operation of the transceiver; and a management unit that determines the wavelength of the optical signal transmitted by the transceiver, in which the management unit determines the wavelength of the optical signal to be transmitted by a transmission-scheduled transceiver that is the transceiver scheduled to transmit the optical signal according to a predetermined rule in a case of acquiring transmission schedule notification information indicating the transmission-scheduled transceiver, and after the determination of the wavelength, the transceiver control unit causes the transmission-scheduled transceiver to transmit the optical signal of the determined wavelength.

One aspect of the present invention is a signal transmission method executed by a signal transmission system that includes a plurality of transceivers that transmits and receives an optical signal, a gateway that receives the optical signal transmitted by the transceiver, performs optical-electrical conversion and electrical-optical conversion for the received optical signal, and outputs the converted optical signal, an optical switch that includes a port connected to the transceiver and a port connected to the gateway, and outputs the optical signal to a port corresponding to a wavelength of the optical signal input to the port, a transceiver control unit that controls an operation of the transceiver, and a management unit that determines the wavelength of the optical signal transmitted by the transceiver, the signal transmission method including: a determination step of determining, by the management unit, the wavelength of the optical signal to be transmitted by a transmission-scheduled transceiver that is the transceiver scheduled to transmit the optical signal according to a predetermined rule in a case of acquiring transmission schedule notification information indicating the transmission-scheduled transceiver; and a control step of causing, after the determination of the wavelength, by the transceiver control unit, the transmission-scheduled transceiver to transmit the optical signal of the determined wavelength.

Advantageous Effects of Invention

According to the present invention, it is possible to suppress an increase in power consumption required for signal transmission.

DESCRIPTION OF EMBODIMENTS

Embodiment

Figure 1:
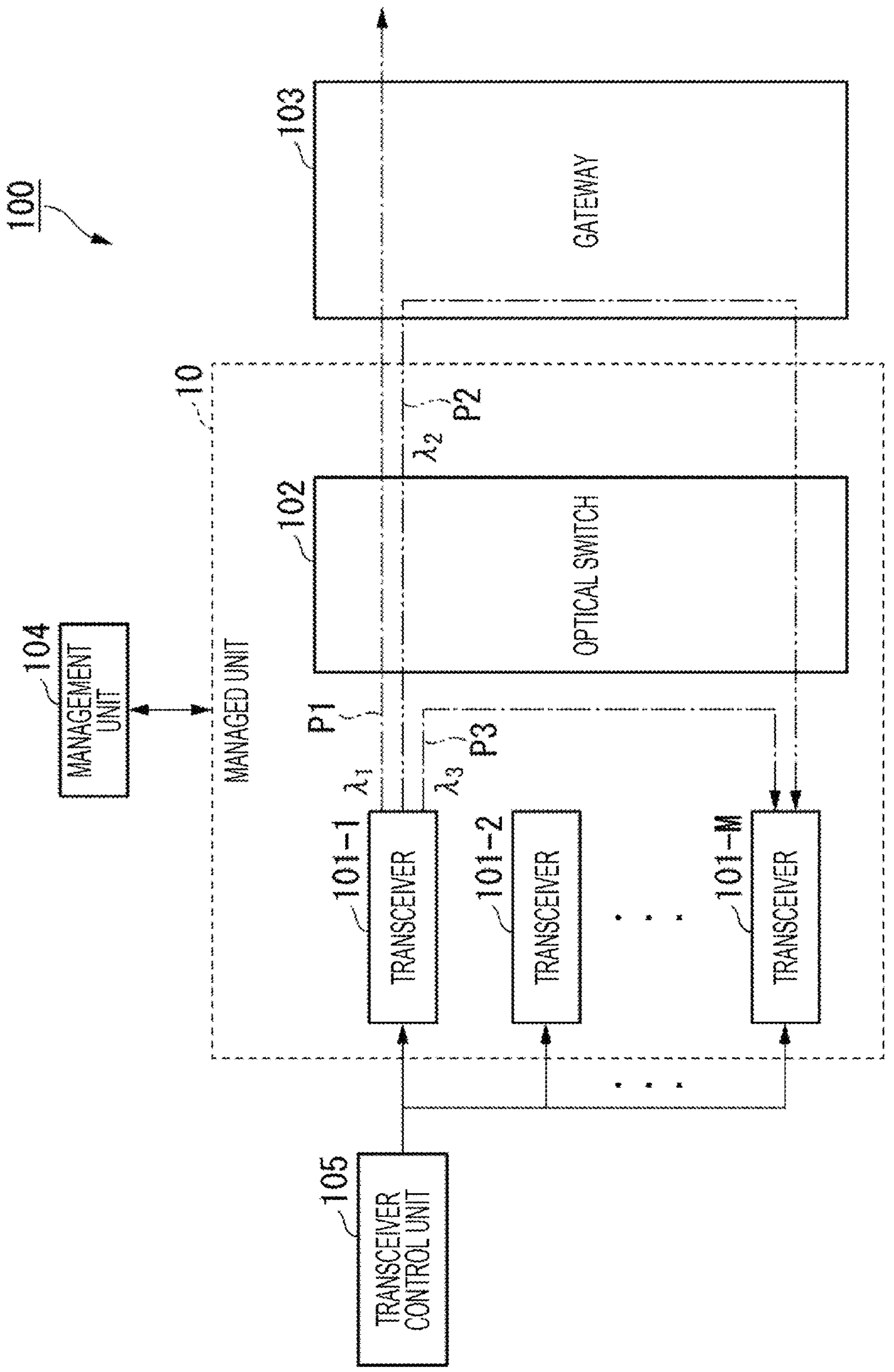
FIG. 1 is an explanatory diagram for describing an outline of a signal transmission system according to an embodiment.

FIG. 1 is an explanatory diagram for describing an outline of a signal transmission system 100 according to an embodiment. Details of an example of implementation of the signal transmission system 100 will be described later, and first, an outline of the signal transmission system 100 will be described.

The signal transmission system 100 includes a managed unit 10, a gateway 103, a management unit 104, and a transceiver control unit 105. A set of one or more signal transmission systems 100 is, for example, a network from a first layer to a third layer in a hyperscale data center network. The managed unit 10 is managed by the management unit 104.

Note that the management unit 104 and the transceiver control unit 105 do not need to be implemented as different devices, and may be implemented as one device having both functions. Furthermore, the management unit 104 may be implemented using a plurality of information processing devices communicably connected via a network. The transceiver control unit 105 may also be implemented using a plurality of information processing devices communicably connected via a network.

The managed unit 10 includes M transceivers 101 including transceivers 101-1 to 101-M (M is an integer of 2 or more), and an optical switch 102. Each transceiver 101 is a transceiver. That is, the transceiver 101 transmits and receives optical signals.

In the case where the signal transmission system 100 is the network from the first layer to the third layer in the hyperscale data center network, the transceivers 101-1 to 101-M may be transceivers in a data center (DC), for example. In such a case, at least some of the transceivers 101-1 to 101-M may belong to a data center different from the other transceivers 101.

The optical switch 102 includes a port connected to the transceiver 101 and a port connected to the gateway 103. Specific examples of the number of ports and a connection relationship will be described in the description of group shuffling transmission described in a modification to be described below. The optical switch 102 outputs the optical signal input to a port to a port corresponding to a wavelength of the optical signal. The optical switch 102 is, for example, a micro electro mechanical system (MEMS).

The gateway 103 receives the optical signal transmitted from the transceiver 101, performs optical-electrical conversion and electrical-optical conversion for the received optical signal, and outputs the converted optical signal. More specifically, the gateway 103 receives the optical signal transmitted from the transceiver 101 via the optical switch 102, performs the optical-electrical conversion and electrical-optical conversion for the received optical signal, and outputs the converted optical signal.

The gateway 103 may be, for example, a regional network gateway (RNG) in the hyperscale data center network.

The management unit 104 manages the managed unit 10. The management unit 104 manages, for example, an operation of the transceiver 101. Specifically, the management of the operation of the transceiver 101 is execution of wavelength determination processing. The wavelength determination processing is processing of determining the wavelength of the optical signal transmitted by a transmission-scheduled transceiver indicated by transmission schedule notification information according to a predetermined rule (hereinafter referred to as a "wavelength determination rule") in a case where the management unit 104 acquires the transmission schedule notification information.

The transmission schedule notification information is information indicating the transmission-scheduled transceiver. The transmission schedule notification information is, for example, emitted light in a case where the transmission-scheduled transceiver supplied with power emits light indicating that the supply of power has been started. The transmission schedule notification information may be, for example, an output electrical signal in a case where the transmission-scheduled transceiver supplied with power outputs the electrical signal indicating that the supply of power has been started.

The transmission-scheduled transceiver is a transceiver 101 scheduled to transmit an optical signal. Hereinafter, the optical signal scheduled to be transmitted is referred to as a transmission-scheduled optical signal.

The transmission schedule notification information is output by the transceiver 101 to which the power has been supplied at timing when the power has been supplied to the transceiver 101, for example. In this case, the transceiver 101 that outputs the transmission schedule notification information is the transmission-scheduled transceiver.

For example, in a case where the transceiver 101 has acquired signal attribute information, the transceiver 101 that has acquired the signal attribute information outputs the transmission schedule notification information. In this case, the transmission schedule notification information is, for example, information including the signal attribute information.

The signal attribute information is information indicating an attribute of the transmission-scheduled optical signal. The signal attribute information includes, for example, information (hereinafter referred to as "transmission destination information") indicating a transmission destination of the transmission-scheduled optical signal. The signal attribute information may include, for example, information (hereinafter referred to as "packet amount information") indicating a packet amount of the transmission-scheduled optical signal. The signal attribute information may include the transmission destination information and the packet amount information.

By the way, the packet amount is an amount corresponding to carried content of the optical signal and is a calculable amount on the basis of the carried content. For example, the packet amount may be calculated by the management unit 104 on the basis of the carried content of the transmission-scheduled optical signal. Hereinafter, processing of calculating the packet amount on the basis of the carried content of the transmission-scheduled optical signal is referred to as packet amount calculation processing.

The wavelength determination rule may be any rule as long as the rule is a predetermined rule for determining a wavelength. The wavelength determination rule may be, for example, a first wavelength determination rule. The first wavelength determination rule is a rule for determining the wavelength of the optical signal to be transmitted by the transmission-scheduled transceiver on the basis of predetermined first correspondence information.

The first correspondence information is information indicating a one-to-one relationship between each transceiver 101 and the wavelength of the optical signal. Therefore, the first wavelength determination rule is, for example, a rule for determining the wavelength indicated by the first correspondence information as the wavelength corresponding to the transmission-scheduled transceiver indicated by the transmission schedule notification information, as the wavelength of the optical signal to be transmitted by the transmission-scheduled transceiver. The first correspondence information is stored in advance in a predetermined storage device, for example.

The wavelength determination rule may be, for example, a second wavelength determination rule. The second wavelength determination rule is a rule for determining the wavelength to be transmitted by the transmission-scheduled transceiver indicated by the transmission schedule notification information on the basis of the signal attribute information. The second wavelength determination rule is, for example, a first-type second wavelength determination rule. The first-type second wavelength determination rule is a rule that, in the case where the signal attribute information includes the transmission destination information, a wavelength associated in advance with each set of the transmission-scheduled transceiver and the transmission destination, as the wavelength of the optical signal to be transmitted by the transmission-scheduled transceiver.

The second wavelength determination rule may be, for example, a second-type second wavelength determination rule. The second-type second wavelength determination rule is a rule that, in the case where the signal attribute information includes the transmission destination information and the packet amount information, a wavelength associated in advance with each set of the transmission-scheduled transceiver, the transmission destination, and the packet amount, as the wavelength of the optical signal to be transmitted by the transmission-scheduled transceiver.

When acquiring the transmission schedule notification information, the management unit 104 may execute not only the processing of determining the wavelength but also, for example, inter-port connection relationship determination processing. The inter-port connection relationship determination processing is processing of determining a port to which the transmission-scheduled optical signal is input and a port from which the transmission-scheduled optical signal is output among the ports included in the optical switch 102 on the basis of the signal attribute information. Hereinafter, the port to which the optical signal is input is referred to as an input port, and the port from which the optical signal is output is referred to as an output port.

As an example, the inter-port connection relationship determination processing in a case where first-type inter-port information is present in advance and the signal attribute information includes the transmission destination information will be described. In this case, the inter-port connection relationship determination processing is processing of determining an input port and an output port indicated by the first-type inter-port information as the input port and the output port of the transmission-scheduled optical signal. The first-type inter-port information is information indicating a set of the input port and the output port for each set of the transmission-scheduled transceiver and the transmission destination.

Note that the first-type inter-port information being present in advance means that the first-type inter-port information has been stored in advance in a predetermined storage device such as a storage unit 43 to be described below, for example.

As another example, the inter-port connection relationship determination processing in a case where second-type inter-port information is present in advance and the signal attribute information includes the transmission destination information and the packet amount information will be described. In this case, the inter-port connection relationship determination processing is processing of determining an input port and an output port indicated by the second-type inter-port information as the input port and the output port of the transmission-scheduled optical signal. The second-type inter-port information is information indicating a set of the input port and the output port for each set of the transmission-scheduled transceiver, the transmission destination, and the packet amount.

Note that the second-type inter-port information being present in advance means that the second-type inter-port information has been stored in advance in a predetermined storage device such as the storage unit 43 to be described below, for example.

The management unit 104 may execute inter-port connection processing, for example. The inter-port connection processing is processing of controlling the operation of the optical switch 102 so that the input port and the output port determined by the inter-port connection relationship determination processing are connected.

The inter-port connection processing of a case where the optical switch 102 is the MEMS is, for example, processing of controlling an actuator included in the MEMS so that the input port and the output port determined by the inter-port connection relationship determination processing are connected.

The optical signal input to the port after the execution of the inter-port connection processing propagates in the optical switch 102 and is output through the output port determined by the inter-port connection processing. In transmission of a signal in such an optical switch, the optical signal propagates to the output port without being converted into an electrical signal. That is, for the transmission of a signal in the optical switch 102, processing that requires the power such as electrical-optical conversion or the optical-electrical conversion is not necessarily required.

The transceiver control unit 105 controls the operation of the transceiver 101. The transceiver control unit 105 controls the operation of the transceiver 101 to cause the transmission-scheduled transceiver to transmit the optical signal at the wavelength determined by the wavelength determination processing.

In the example of FIG. 1, one transceiver control unit 105 is provided for the transceivers 101-1 to 101-M. However, the number of transceiver control units 105 is not necessarily one for the transceivers 101-1 to 101-M.

For simplicity of description, the signal transmission system 100 will be described taking a case where one transceiver control unit 105 controls the operation of each of the transceivers 101-1 to 101-M as an example.

<Example of Transmission Path of Optical Signal in Signal Transmission System>

An example of a transmission path of the optical signal in the signal transmission system 100 will be described with reference to FIG. 1. FIG. 1 illustrates three paths of a path P1, a path P2, and a path P3 as examples of the transmission path.

The path P1 is a path of a signal having a wavelength $\lambda_1$ that propagates from the transceiver 101-1 to a network that is the connection destination of the gateway 103 via the optical switch 102 and the gateway 103. The path P2 is a path of a signal having a wavelength $\lambda_2$ that propagates from the transceiver 101-1 to another transceiver 101-M via the optical switch 102 and the gateway 103. The path P3 is a path of a signal having a wavelength $\lambda_3$ that propagates from the transceiver 101-1 to another transceiver 101-M via the optical switch 102 without passing through the gateway 103.

As described above, since the signal transmission system 100 includes the optical switch 102, the signal transmission system 100 can transmit signals between the transceivers 101 without via the gateway 103. Then, in the case of transmitting a signal by the optical switch 102, the necessary power is only the power required for processing of changing the association between the ports of the optical switch 102, and the power is not required for the optical signal to propagate in the optical switch 102 as described above.

Meanwhile, in the case of transmitting a signal via the gateway 103, the electrical-optical conversion and the optical-electrical conversion are required when the signal propagates in the gateway 103, and thus the power is required for the propagation in the gateway 103 itself. This power is larger than the power required for the processing of changing the association between the ports of the optical switch 102.

Therefore, the signal transmission system 100 can suppress an increase in power consumption as compared with a system that does not include the optical switch 102.

Next, some examples of a flow of processing executed in the signal transmission system 100 will be described.

Figure 2:
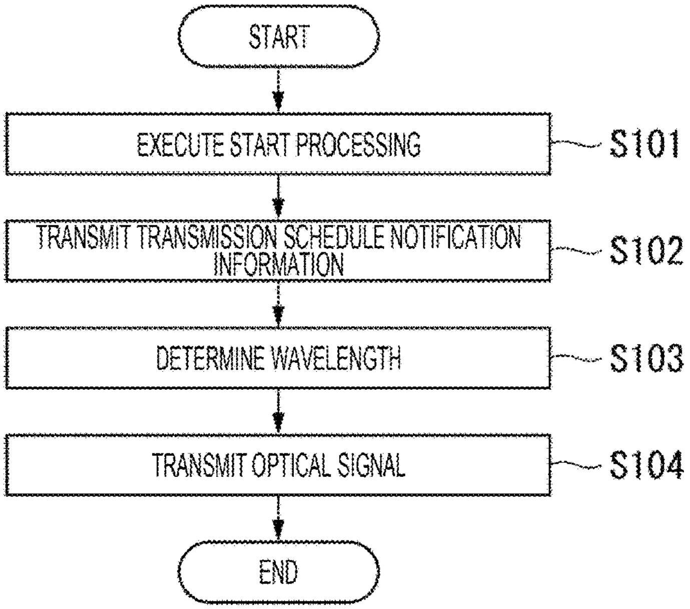
FIG. 2 is a first flowchart illustrating an example of a flow of processing executed in the signal transmission system according to the embodiment.

FIG. 2 is a first flowchart illustrating an example of a flow of processing executed in the signal transmission system 100 according to the embodiment. More specifically, FIG. 2 is a flowchart illustrating an example of a flow of processing executed in the signal transmission system 100 in the case where the wavelength determination rule is the first wavelength determination rule.

Start processing for the transmission-scheduled transceiver is executed (step S101). The start processing may be any processing as long as the processing causes the transceiver to start processing of transmitting the optical signal. The start processing is, for example, processing of starting supply of power to the transceiver. The start processing may be, for example, carried content input processing. The carried content input processing is processing of inputting information (hereinafter referred to as "carried content information") indicating content to be carried by the optical signal to the transmission-scheduled transceiver.

Next, the transmission-scheduled transceiver transmits the transmission schedule notification information to the management unit 104 (step S102). Next, the management unit 104 executes the wavelength determination processing. By the execution of the wavelength determination processing, the wavelength of the transmission-scheduled optical signal to be transmitted by the transmission-scheduled transceiver that is a transmission source of the transmission schedule notification information is determined according to the first wavelength determination rule (step S103).

Next, the transceiver control unit 105 controls the operation of the transmission-scheduled transceiver to transmit the optical signal having the wavelength determined in step S103 (step S104). In such a case, the content carried by the optical signal is, for example, predetermined content. In the case where the start processing is the optical signal input processing, the content to be carried by the optical signal transmitted in step S104 may be, for example, the content indicated by the carried content information input in the carried content input processing.

Figure 3:
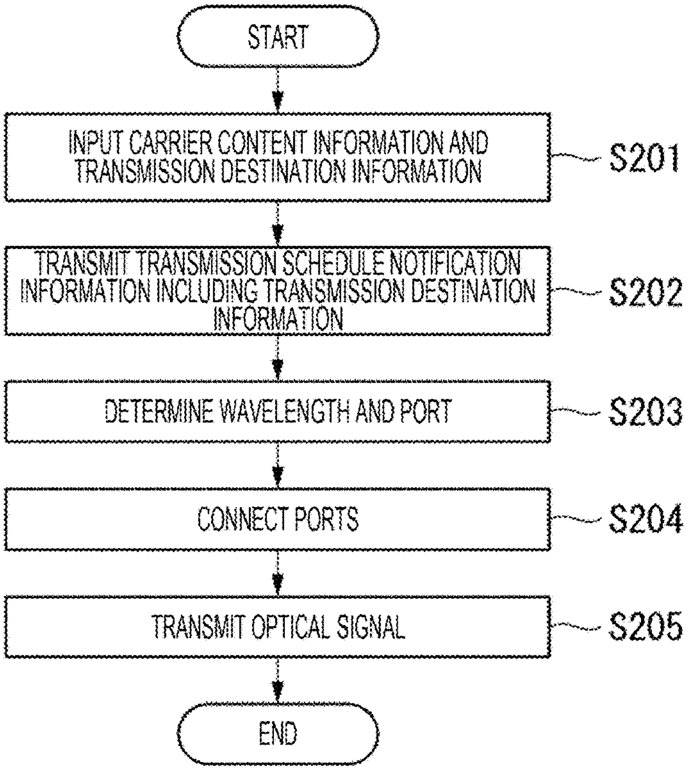
FIG. 3 is a second flowchart illustrating an example of a flow of processing executed in the signal transmission system according to the embodiment.

FIG. 3 is a second flowchart illustrating an example of a flow of processing executed in the signal transmission system 100 according to the embodiment. More specifically, FIG. 3 is a flowchart illustrating an example of a flow of processing executed in the signal transmission system 100 in the case where the wavelength determination rule is the first-type second wavelength determination rule.

The carried content information and the transmission destination information are input to the transmission-scheduled transceiver (step S201). Next, the transmission-scheduled transceiver transmits the transmission schedule notification information including the transmission destination information to the management unit 104 (step S202). Next, the management unit 104 executes the wavelength determination processing and the inter-port connection relationship determination processing (step S203).

By the execution of the wavelength determination processing, the wavelength of the transmission-scheduled optical signal to be transmitted by the transmission-scheduled transceiver that is a transmission source of the transmission schedule notification information is determined according to the first-type second wavelength determination rule. Then, the port to which the transmission-scheduled optical signal is input and the port from which the transmission-scheduled optical signal is output are determined by the inter-port connection relationship determination processing.

Next, the management unit 104 executes the inter-port connection processing (step S204). By executing the inter-port connection processing, the input port and the output port determined in step S203 are connected.

Next, the transceiver control unit 105 controls the operation of the transmission-scheduled transceiver to transmit the optical signal having the wavelength determined in step S203 (step S205). In such a case, the content carried by the optical signal is, for example, the content indicated by the carried content information.

Note that, in a case where the connection relationship between ports is fixed in advance and the output port corresponding to one input port depends on the wavelength, the inter-port connection relationship determination processing does not necessarily need to be executed. Such an optical switch 102 includes, for example, a prism on an optical path of the optical signal, and changes the optical path for each wavelength. In such a case, the input port and the output port are determined only by determining the wavelength. In such a case, the inter-port connection processing is not executed.

Note that, in the case where the output port corresponding to one input port depends on the wavelength, the wavelength of the optical signal transmitted by the transmission-scheduled transceiver indicated by the transmission schedule notification information may be determined according to the first wavelength determination rule. The optical switch 102 in the case of following the first wavelength determination rule may be, for example, an optical switch including the above-described prism on the optical path of the optical signal and changing the optical path for each wavelength. In such a case, the input port and the output port are determined only by determining the wavelength. Therefore, even in the case of following the first wavelength determination rule, the inter-port connection processing does not need to be executed.

Figure 4:
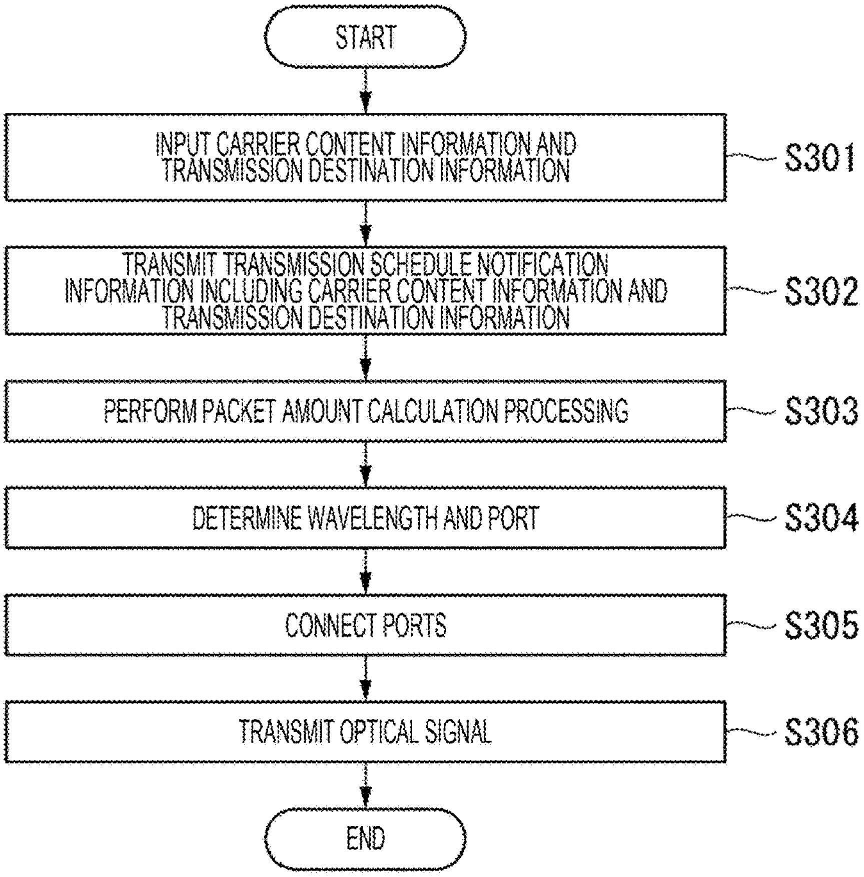
FIG. 4 is a third flowchart illustrating an example of a flow of processing executed in the signal transmission system according to the embodiment.

FIG. 4 is a third flowchart illustrating an example of a flow of processing executed in the signal transmission system 100 according to the embodiment. More specifically, FIG. 4 is a flowchart illustrating an example of a flow of processing executed in the signal transmission system 100 in the case where the wavelength determination rule is the second-type second wavelength determination rule.

The carried content information and the transmission destination information are input to the transmission-scheduled transceiver (step S301). Next, the transmission-scheduled transceiver transmits the transmission schedule notification information including the carried content information and the transmission destination information to the management unit 104 (step S302).

By the way, as described above, the packet amount is an amount corresponding to carried content and is a calculable amount on the basis of the carried content. That is, the packet amount is an amount calculable on the basis of the carried content information. Therefore, in the case where the carried content information is transmitted, the management unit 104 that has acquired the carried content information acquires the packet amount information by executing the packet amount calculation processing (step S303). Therefore, the carried content information is also an example of information indicating the packet amount.

Next, the management unit 104 executes the wavelength determination processing and the inter-port connection relationship determination processing (step S304).

By the execution of the wavelength determination processing, the wavelength of the transmission-scheduled optical signal to be transmitted by the transmission-scheduled transceiver that is a transmission source of the transmission schedule notification information is determined according to the second-type second wavelength determination rule. Then, the port to which the transmission-scheduled optical signal is input and the port from which the transmission-scheduled optical signal is output are determined by the inter-port connection relationship determination processing.

Next, the management unit 104 executes the inter-port connection processing (step S305). By executing the inter-port connection processing, the input port and the output port determined in step S304 are connected.

Next, the transceiver control unit 105 controls the operation of the transmission-scheduled transceiver to transmit the optical signal having the wavelength determined in step S304 (step S306). In such a case, the content carried by the optical signal is, for example, the content indicated by the carried content information.

Note that, similarly to the example of FIG. 3, in the case where the connection relationship between ports is fixed in advance and the output port corresponding to one input port depends on the wavelength, the inter-port connection relationship determination processing does not necessarily need to be executed. Such an optical switch 102 includes, for example, a prism on an optical path of the optical signal, and changes the optical path for each wavelength. In such a case, the input port and the output port are determined only by determining the wavelength. In such a case, the inter-port connection processing is not executed.

In the case where not only the carried content information but also the packet amount information directly indicating the packet amount are input in step S301, the packet amount information directly indicating the packet amount may be transmitted instead of the carried content information in step S302. In such a case, the packet amount indicated by the packet amount information is the packet amount of the content indicated by the carried content information. Then, in such a case, the processing of step S303 is not executed, and the processing of step S304 is executed after the processing of step S302.

By the way, the management unit 104 is provided in a device. Hereinafter, the device including the management unit 104 is referred to as a management device 4. Hereinafter, an example of a configuration of the management device 4 will be described with reference to FIGS. 5 and 6.

Figure 5:
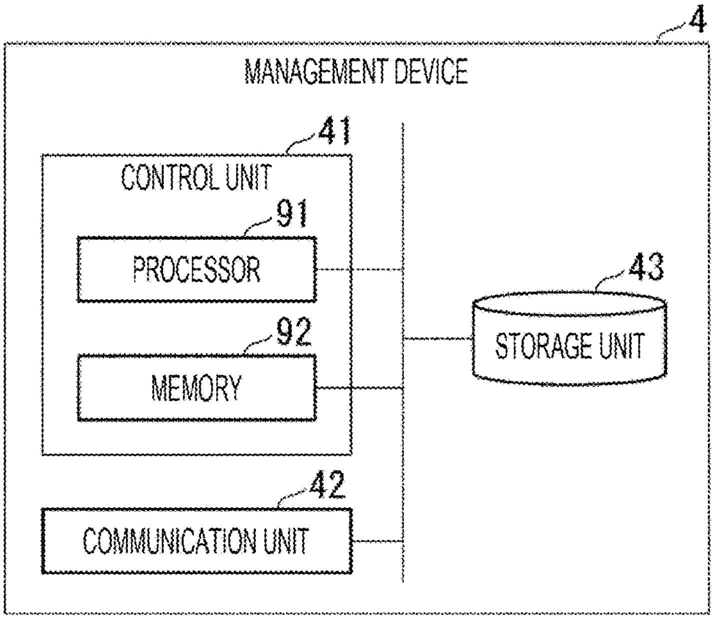
FIG. 5 is a diagram illustrating an example of a hardware configuration of a management device according to the embodiment.

FIG. 5 is a diagram illustrating an example of a hardware configuration of the management device 4 according to the embodiment. The management device 4 includes a control unit 41 including a processor 91 such as a central processing unit (CPU) and a memory 92, which are connected to each other via a bus, and executes a program. The management device 4 functions as a device including the control unit 41, a communication unit 42, and a storage unit 43 by executing the program.

More specifically, in the management device 4, the processor 91 reads the program stored in the storage unit 43, and stores the read program in the memory 92. When the processor 91 executes the program stored in the memory 92, the management device 4 functions as a device including the control unit 41, the communication unit 42, and the storage unit 43.

The control unit 41 controls operations of various functional units included in the management device 4. The management unit 104 is included in the control unit 41. That is, the control unit 41 includes the management unit 104.

The communication unit 42 includes an interface for connecting the management device 4 to an external device. The communication unit 42 communicates with the external device in a wired or wireless manner. The external device is, for example, the transceiver 101. The communication unit 42 receives the transmission schedule notification information by communication with the transceiver 101.

The external device is, for example, the transceiver control unit 105. The communication unit 42 notifies the transceiver control unit 105 of the determined wavelength by communication with the transceiver control unit 105. The external device may be, for example, the optical switch 102. The communication unit 42 controls the operation of the optical switch 102 by communicating with the optical switch 102.

The external device may be an input device such as a mouse, a keyboard, or a touch panel. The external device may be, for example, a display device such as a cathode ray tube (CRT) display, a liquid crystal display, or an organic electro-luminescence (EL) display.

The storage unit 43 is configured using a computer-readable storage medium device such as a magnetic hard disk device or a semiconductor storage device. The storage unit 43 stores various types of information regarding the management device 4. The storage unit 43 stores, for example, various types of information generated as a result of processing executed by the control unit 41. The storage unit 43 stores, for example, the first-type inter-port information in advance. The storage unit 43 stores, for example, the second-type inter-port information in advance.

Figure 6:
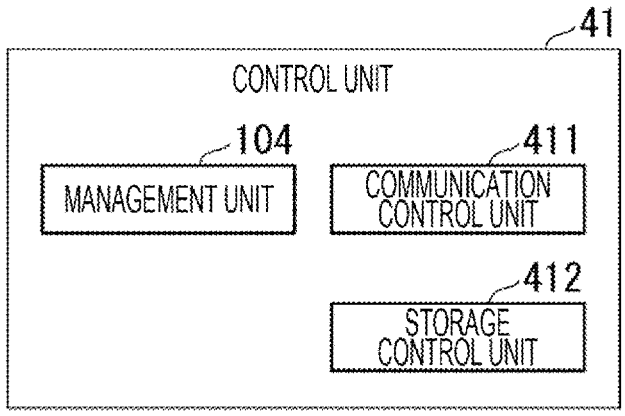
FIG. 6 is a diagram illustrating an example of a configuration of a control unit included in the management device according to the embodiment.

FIG. 6 is a diagram illustrating an example of a configuration of the control unit 41 included in the management device 4 according to the embodiment. The control unit 41 includes a management unit 104, a communication control unit 411, and a storage control unit 412. The communication control unit 411 controls the operation of the communication unit 42. The storage control unit 412 controls the operation of the storage unit 43.

The transceiver control unit 105 is also included in an apparatus. Hereinafter, the device including the transceiver control unit 105 is referred to as a transceiver control device 5. Hereinafter, an example of a configuration of the transceiver control device 5 will be described with reference to FIGS. 7 and 8.

Figure 7:
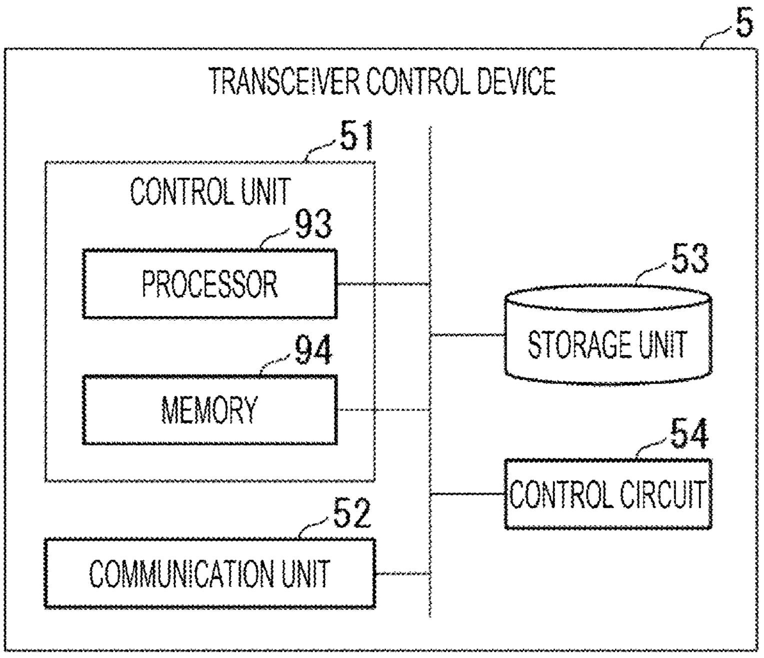
FIG. 7 illustrates an example of a hardware configuration of a transceiver control device according to the embodiment.

FIG. 7 illustrates an example of a hardware configuration of the transceiver control device 5 according to the embodiment. The transceiver control device 5 includes a control unit 51 including a processor 93 such as a central processing unit (CPU) and a memory 94 connected via a bus and executes a program. The transceiver control device 5 functions as a device including the control unit 51, a communication unit 52, a storage unit 53, and a control circuit 54 by executing the program.

More specifically, in the transceiver control device 5, the processor 93 reads the program stored in the storage unit 53, and stores the read program in the memory 94. When the processor 93 executes the program stored in the memory 94, the transceiver control device 5 functions as a device including the control unit 51, the communication unit 52, the storage unit 53, and the control circuit 54.

The control unit 51 controls operations of various functional units included in the transceiver control device 5. The transceiver control unit 105 is included in the control unit 51. That is, the control unit 51 includes the transceiver control unit 105.

The communication unit 52 includes an interface for connecting the transceiver control device 5 to an external device. The communication unit 52 communicates with the external device in a wired or wireless manner. The external device is, for example, the transceiver 101. The communication unit 52 controls the operation of the transceiver 101 by communication with the transceiver 101. For example, the communication unit 52 controls the operation of the transmission-scheduled transceiver by communication with the transmission-scheduled transceiver, and causes the transceiver to transmit the transmission-scheduled optical signal having the wavelength determined by the management unit 104.

The external device is, for example, the management unit 104. The communication unit 52 acquires information indicating the wavelength determined by the management unit 104 by communication with the management unit 104.

The external device may be an input device such as a mouse, a keyboard, or a touch panel. The external device may be, for example, a display device such as a CRT display, a liquid crystal display, or an organic EL display.

Note that inputting the carried content information, the transmission destination information, and the packet amount information to the transceiver 101 may mean inputting the carried content information, the transmission destination information, and the packet amount information to the communication unit 52, for example. In such a case, the carried content information, the transmission destination information, and the packet amount information input to the communication unit 52 are recorded in the storage unit 53, for example.

The input of the carried content information, the transmission destination information, and the packet amount information to the communication unit 52 is performed by, for example, an input from an external device connected to the communication unit 52. The input of the carried content information, the transmission destination information, and the packet amount information to the communication unit 52 may be performed by, for example, a user's input to an input device connected to the communication unit 52.

Note that the transceiver 101 transmitting the transmission schedule notification information may mean, for example, the communication unit 52 transmitting the transmission schedule notification information recorded in the storage unit 53.

The storage unit 53 is configured using a computer-readable storage medium device such as a magnetic hard disk device or a semiconductor storage device. The storage unit 53 stores various types of information regarding the transceiver control device 5. The storage unit 53 stores, for example, various types of information generated as a result of processing executed by the control unit 51. The storage unit 53 stores, for example, the transmission schedule notification information.

The control circuit 54 is a circuit connected to the transceiver 101. The control circuit 54 is a circuit that operates under the control of the transceiver control unit 105 and controls a state of power supply to the transceiver 101. A detailed example of the control circuit 54 will be described below.

Figure 8:
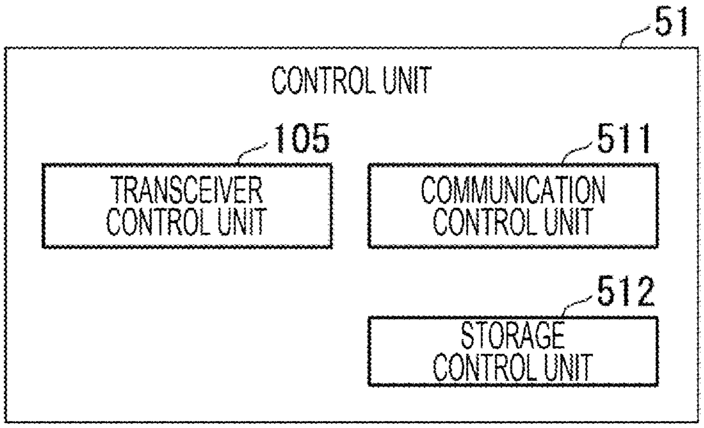
FIG. 8 is a diagram illustrating an example of a configuration of a control unit included in the transceiver control device according to the embodiment.

FIG. 8 is a diagram illustrating an example of a configuration of the control unit 51 included in the transceiver control device 5 according to the embodiment. The control unit 51 includes a transceiver control unit 105, a communication control unit 511, and a storage control unit 512. As described above, the transceiver control unit 105 controls the operation of the transceiver 101 by controlling the operation of the control circuit 54. The communication control unit 511 controls the operation of the communication unit 52. The storage control unit 512 controls the operation of the storage unit 53.

Figure 9:
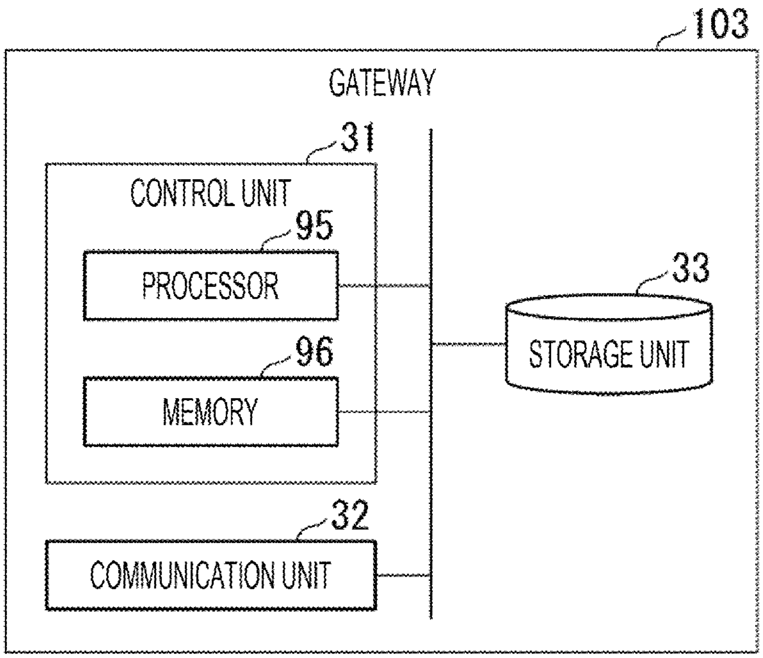
FIG. 9 is a diagram illustrating an example of a hardware configuration of a gateway according to the embodiment.

FIG. 9 is a diagram illustrating an example of a hardware configuration of the gateway 103 according to the embodiment. The gateway 103 includes a control unit 31 including a processor 95 such as a CPU and a memory 96 connected by a bus, and executes a program. The gateway 103 functions as a device including a control unit 31, a communication unit 32, and a storage unit 33 by executing the program.

More specifically, in the gateway 103, the processor 95 reads the program stored in the storage unit 33, and stores the read program in the memory 96. When the processor 95 executes the program stored in the memory 96, the gateway 103 functions as a device including the control unit 31, the communication unit 32, and the storage unit 33.

The control unit 31 controls operations of various functional units included in the gateway 103.

The communication unit 32 includes an interface for connecting the gateway 103 to an external device. The communication unit 32 communicates with the external device in a wired or wireless manner. The external device is, for example, the optical switch 102. The communication unit 32 performs wired communication with the optical switch 102. A medium of communication is an optical signal. The external device is, for example, another gateway 103.

The external device may be an input device such as a mouse, a keyboard, or a touch panel. The external device may be, for example, a display device such as a CRT display, a liquid crystal display, or an organic EL display.

The storage unit 33 is configured using a computer-readable storage medium device such as a magnetic hard disk device or a semiconductor storage device. The storage unit 33 stores various types of information regarding the gateway 103. The storage unit 33 stores, for example, various types of information generated as a result of processing executed by the gateway 103. The storage unit 33 may store, for example, a routing table in advance.

Example of Configuration of Transceiver

Here, an example of a configuration of the transceiver will be described.

Figure 10:
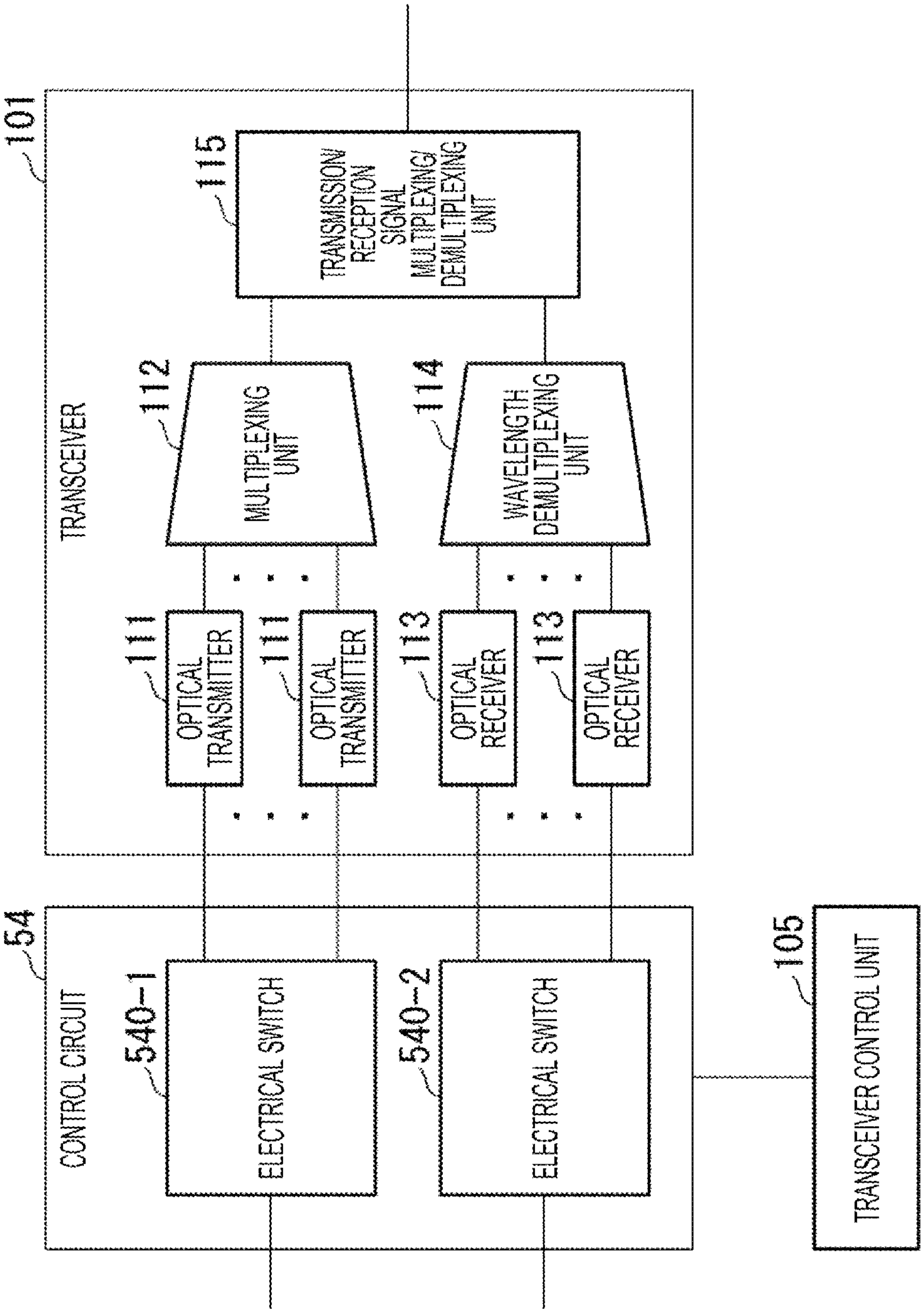
FIG. 10 is a diagram illustrating an example of a configuration of a transceiver according to the embodiment.

FIG. 10 is a diagram illustrating an example of a configuration of the transceiver 101 in the embodiment together with the control circuit 54 and the transceiver control unit 105. As illustrated in FIG. 10, the control circuit 54 includes, for example, an even number of electrical switches 540. In the example of FIG. 10, the control circuit 54 includes two electrical switches 540 including an electrical switch 540-1 and an electrical switch 540-2.

One electrical switch 540 is an electrical switch used for transmission of the optical signal by the transceiver 101, and the other electrical switch 540 is an electrical switch used for reception of the optical signal by the transceiver 101. The electrical switch means a switch that controls a current.

In the example of FIG. 10, the transceiver 101 includes a plurality of optical transmitters 111, a multiplexing unit 112, a plurality of optical receivers 113, a wavelength demultiplexing unit 114, and a transmission/reception signal multiplexing/demultiplexing unit 115. The optical transmitter 111 outputs the optical signal. The optical transmitter 111 is connected to the electrical switch 540-1.

The multiplexing unit 112 is connected to the optical transmitter 111 and multiplexes the optical signals output from the plurality of optical transmitters 111. The multiplexing unit 112 may be configured using an optical splitter or may be configured using an arrayed waveguide grating (AWG), for example.

The optical receiver 113 receives the optical signal. The optical receiver 113 is connected to the electrical switch 540-2. The optical receiver 113 receives a signal demultiplexed for each wavelength by the wavelength demultiplexing unit 114 and passes the signal to the electrical switch 540-2.

Note that the numbers of the optical transmitters 111 and the optical receivers 113 are determined by, for example, the number of simultaneous connection destinations of the transceiver 101.

The wavelength demultiplexing unit 114 is connected to the optical receiver 113 and demultiplexes the input optical signal for each wavelength.

The transmission/reception signal multiplexing/demultiplexing unit 115 is connected to the multiplexing unit 112, the wavelength demultiplexing unit 114, and an external device of the transceiver 101. The transmission/reception signal multiplexing/demultiplexing unit 115 outputs the optical signal propagated from the multiplexing unit 112 to the external device. The transmission/reception signal multiplexing/demultiplexing unit 115 outputs the optical signal propagated from the external device toward the wavelength demultiplexing unit 114.

The control circuit 54 is controlled by the transceiver control unit 105. The operation of the electrical switch 540 is controlled by the control of the transceiver control unit 105. By controlling the operation of the electrical switch 540, the power supplied to the optical transmitter 111 or the optical receiver 113 connected to the electrical switch 540 is controlled.

In a case where, for example, the electrical switch 540-1 is changed from a non-conductive state to a conductive state by the control of the transceiver control unit 105, power supply to the optical transmitter 111 is started. This is an example of the start processing. When the power supply to the optical transmitter 111 is started, the optical transmitter 111 outputs, for example, the optical signal indicating the transmission schedule notification information.

The optical transmitter 111 may always be in a light emitting state and transmit an idle signal during non-communication. In addition, the optical transmitter 111 may be turned off to reduce power consumption during non-communication.

The signal transmission system 100 configured as described above includes the optical switch 102 between the transceiver 101 and the gateway 103. Therefore, signals can be transmitted between the transceivers 101 without passing through the gateway 103. Therefore, as described above, the signal transmission system 100 can suppress an increase in power consumption as compared with a system that does not include the optical switch 102.

In addition, since the signal transmission system 100 configured as described above includes the optical switch 102 between the transceiver 101 and the gateway 103, it is not always necessary to perform optical-electrical conversion and electrical-optical conversion. For example, in transmission of the optical signal from one of the transceivers 101 to another transceiver 101, it is possible to transmit the optical signal as it is. Therefore, the signal transmission system 100 can suppress a reduction in communication delay.

Modification

Note that, in the signal transmission system 100, group shuffling transmission may be executed. The group shuffling transmission is transmission satisfying following grouping transmission conditions. The grouping transmission condition includes a condition that the transceivers 101-1 to 101-M are regrouped every predetermined unit time t. The number of groups may be one or two or more.

The grouping transmission condition also includes a condition that signal transmission not via the gateway 103 is performed only between the transceivers 101 in each group during each unit time t. The grouping transmission condition also includes a condition that an arbitrary transceiver 101 is connected to another transceiver 101 at least once in a predetermined unit period T longer than the unit time t.

In such a case, all of combinations of the signal transmission between the transceivers 101-1 to 101-M and the signal transmission between the transceivers 101-1 to 101-M and the gateway 103 are realized in the predetermined unit period T longer than the unit time t. However, the number of ports to be provided in the optical switch 102 may be smaller than that in a case of absence of grouping.

The reason will be described in more detail. First, the number of ports included in the optical switch 102 will be described by taking, as an example, a case where the group shuffling transmission is not executed, the number of transceivers 101 included in the signal transmission system 100 is s, and the number of wavelengths is s. Note that s is an integer of 2 or more. In particular, to simplify the description, the description will be given using the transceivers 101 having one core and the same transmission/reception wavelength.

In such a case, each transceiver 101 communicates with (s−1) other transceivers 101 via the optical switch 102 without via the gateway 103. Therefore, the optical switch 102 has s(s−1) ports for communication via the optical switch 102 without via the gateway 103 on a transceiver side. Each transceiver 101 is also connected to the gateway 103.

Therefore, the optical switch 102 has s ports connecting the transceivers 101 and the gateway 103 on the transceiver side. Therefore, the optical switch 102 has a total of s(s−1)+s ports on the transceiver side. Note that such a number of ports and connection relationship are one of specific examples of the number of ports and the connection relationship included in the optical switch 102.

Meanwhile, the number of ports on a gateway side among the ports included in the optical switch 102 is s because the number of transceivers 101 is enough for the number of ports. Therefore, the total number of ports connected to the transceivers 101 among the ports included in the optical switch 102 is s(s−1)+s+s=s(s+1).

Next, a case where the group shuffling transmission is executed will be described. For simplicity of description, description will be given taking a case where there are c transceivers in one group (c is an integer of 1 or more) and the number of groups is 2 or more, as a specific example.

In the case where group shuffling transmission is executed, each transceiver 101 simply has to be connected to (c−1) other transceivers 101 and the gateway 103. Therefore, the optical switch 102 simply has to have c ports on the transceiver side and one port on the gateway side for each transceiver 101.

That is, in the case where the group shuffling transmission is executed, the number of ports on the transceiver side of the optical switch 102 simply has to be cs, and the number of ports on the gateway side simply has to be s. Therefore, in the case where the group shuffling transmission is executed, the number of ports included in the optical switch 102 is cs+s. Such a number of ports and connection relationship are also one of specific examples of the number of ports and the connection relationship included in the optical switch 102.

In a case where the number of transceivers 101 in one group is c at the maximum, there may be a case where the number of ports is excessive. However, if the optical switch 102 has cs+s ports, it is possible to execute the group shuffling transmission.

As described above, the group shuffling transmission can achieve both realization of all the combinations of signal transmission among the transceivers 101-1 to 101-M and signal transmission between the transceivers 101-1 to 101-M and the gateway 103, and reduction in the number of ports.

Figure 11:
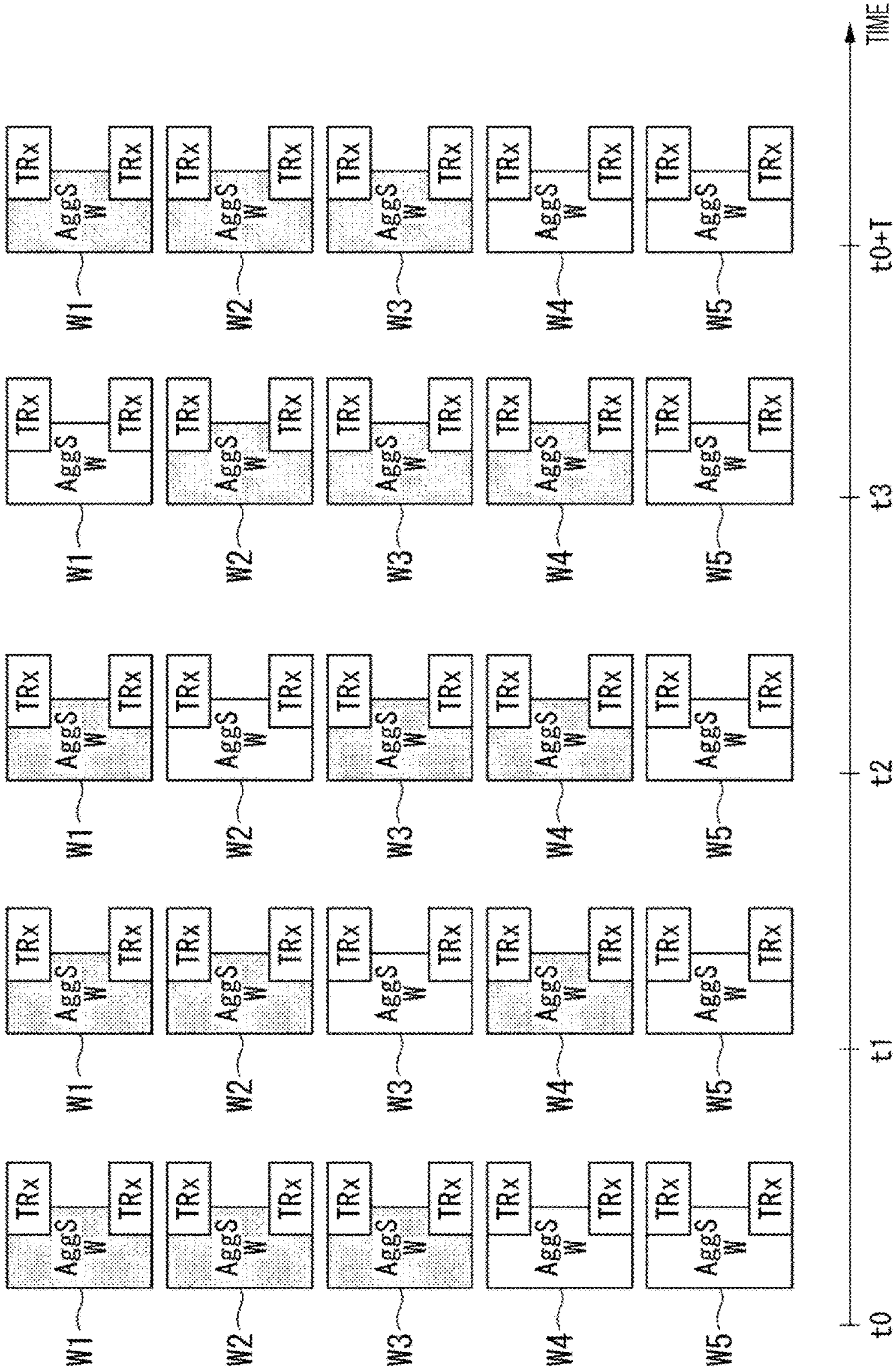
FIG. 11 is an explanatory diagram for describing group shuffling transmission according to a modification.

FIG. 11 is an explanatory diagram for describing the group shuffling transmission according to the modification. More specifically, FIG. 11 is a diagram illustrating an example of a state of transition of grouping, using five end switches as an example. In FIG. 11, "AggSW" means an end switch. In FIG. 11, "TRx" means a transceiver.

FIG. 11 illustrates that in the period from time to to time t1, the end switches W1 to W3 are in one group, and the end switches W4 and W5 are in the other one group. FIG. 11 illustrates that in the period from time t1 to time t2, the end switches W1, W2, and W4 are in one group, and the end switches W3 and W5 are in the other one group. FIG. 11 illustrates that in the period from time t2 to time t3, the end switches W1, W3, and W4 are in one group, and the end switches W2 and W5 are in the other one group.

FIG. 11 illustrates that in the period from time t3 to time (t0+T), the end switches W2 to W4 are in one group, and the end switches W1 and W5 are in the other group. FIG. 11 illustrates that the grouping returns to the grouping from time t0 to time t1 at time (t0+T). Note that T in FIG. 11 means the above-described unit period T.

Such group shuffling transmission is executed by the management unit 104 controlling the operations of the transceiver control unit 105, the optical switch 102, and the transceiver 101. That is, the management unit 104 controls the operation of the optical switch 102 and controls the operation of the transceiver 101 via the control of the transceiver control unit 105 to execute the group shuffling transmission.

Note that the management device 4 and the transceiver control device 5 do not necessarily need to be implemented as different devices. The management device 4 and the transceiver control device 5 may be implemented as, for example, one device or system having both functions.

In addition, each functional unit included in the management device 4 and the transceiver control device 5 may be implemented using a plurality of information processing devices communicably connected via a network. For example, the control unit 41 and the storage unit 43 may be configured using a plurality of information processing devices communicably connected via a network.

Figure 12:
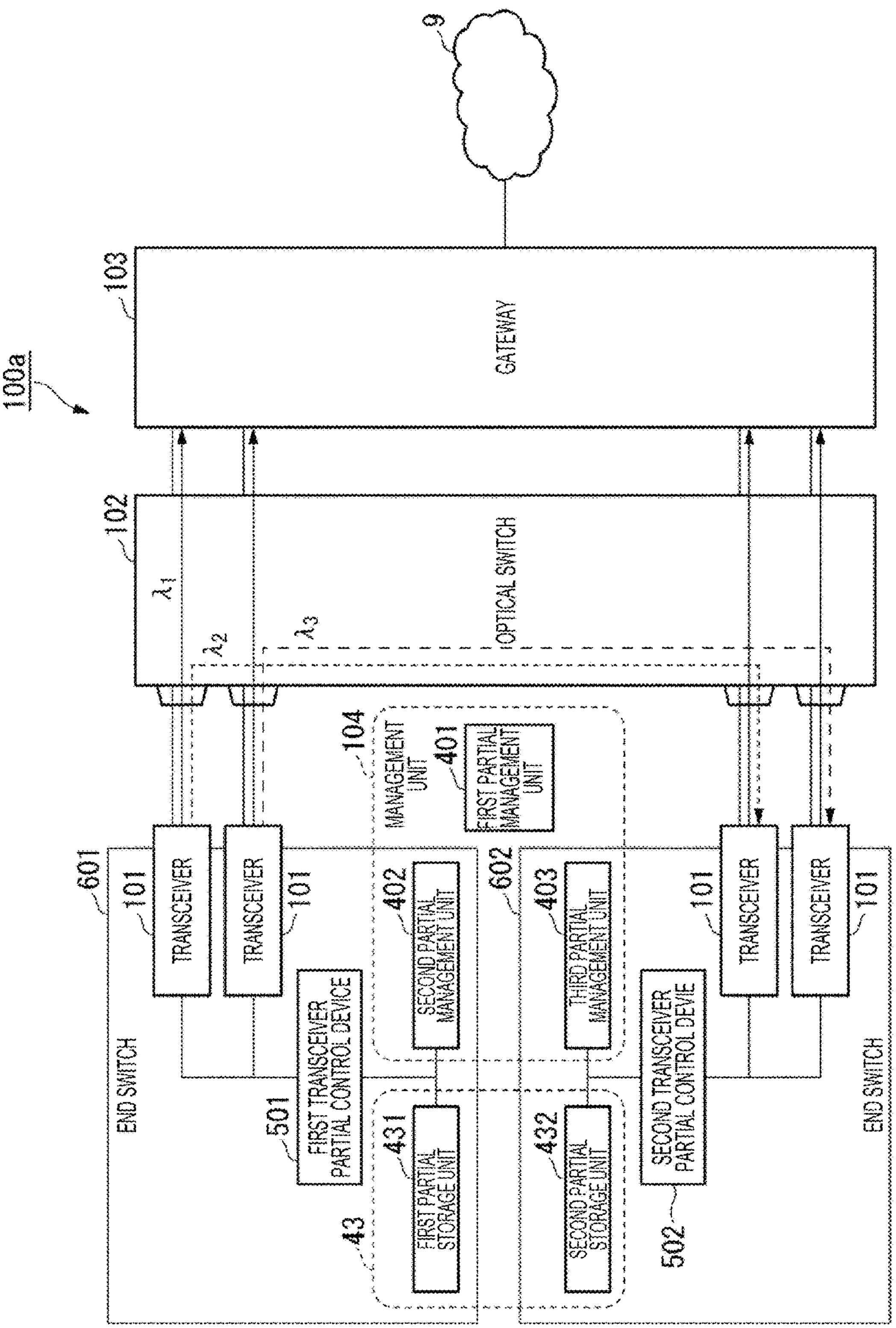
FIG. 12 is a diagram illustrating an example of a configuration of a signal transmission system according to a modification.

Therefore, for example, the signal transmission system 100 may be configured as illustrated in FIG. 12 below. Hereinafter, the signal transmission system 100 in which the management device 4 and the transceiver control device 5 are implemented using a plurality of information processing devices is referred to as a signal transmission system 100*a*.

FIG. 12 is a diagram illustrating an example of a configuration of the signal transmission system 100*a* according to the modification. Those having similar functions to those of the signal transmission system 100 are denoted by the same reference numerals as in FIGS. 1 to 10, and description thereof is omitted.

The signal transmission system 100*a* includes an end switch 601 and an end switch 602. Both the end switch 601 and the end switch 602 are end switches including a plurality of transceivers 101. Note that the signal transmission system 100*a* including two end switches is merely an example, and may include two or more end switches or may include one end switch. In addition, all the end switches including a plurality of transceivers 101 is merely an example, and the signal transmission system 100*a* may include an end switch including one transceiver 101.

The management unit 104 in the signal transmission system 100 is configured in a state of being distributed into a plurality of management units including a first partial management unit 401, a second partial management unit 402, and a third partial management unit 403 in the signal transmission system 100*a*. That is, in FIG. 12, the first partial management unit 401, the second partial management unit 402, and the third partial management unit 403 are all part of the management unit 104.

The storage unit 43 in the signal transmission system 100 is configured in a state of being distributed into a plurality of storage units including a first partial storage unit 431 and a second partial storage unit 432 in the signal transmission system 100*a*. That is, in FIG. 12, both the first partial storage unit 431 and the second partial storage unit 432 are part of the storage unit 43.

The transceiver control device 5 in the signal transmission system 100 is configured in a state of being distributed into a plurality of transceiver control devices including a first transceiver partial control device 501 and a second transceiver partial control device 502 in the signal transmission system 100*a*. That is, in FIG. 12, both the first transceiver partial control device 501 and the second transceiver partial control device 502 are part of the transceiver control device 5.

Note that a network 9 is a network to which the gateway 103 is connected.

<Example of Details of Configuration of Transceiver>

The transceiver 101 switches the communication destination by switching the transmission wavelength. At this time, a wavelength switching speed of the transceiver 101 is favorably faster than a path switching speed of the optical switch 102 disposed on the communication path. The example of FIG. 10 is an example of a configuration satisfying such a condition, and is an example of a configuration including a plurality of optical transmitters that transmits different wavelengths in parallel. Here, an example of a more detailed configuration of the transceiver that satisfies such a condition will be described with reference to FIGS. 13 and 14 below.

Figure 13:
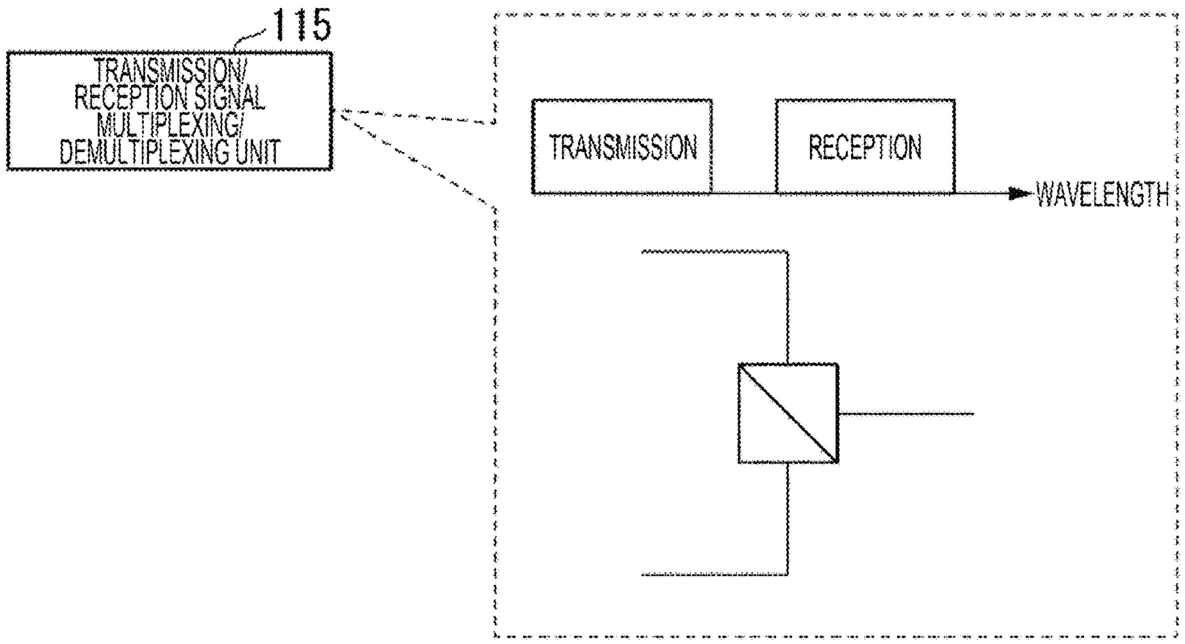
FIG. 13 is a first explanatory diagram for describing an example of details of a configuration of a transceiver in a modification.
Figure 14:
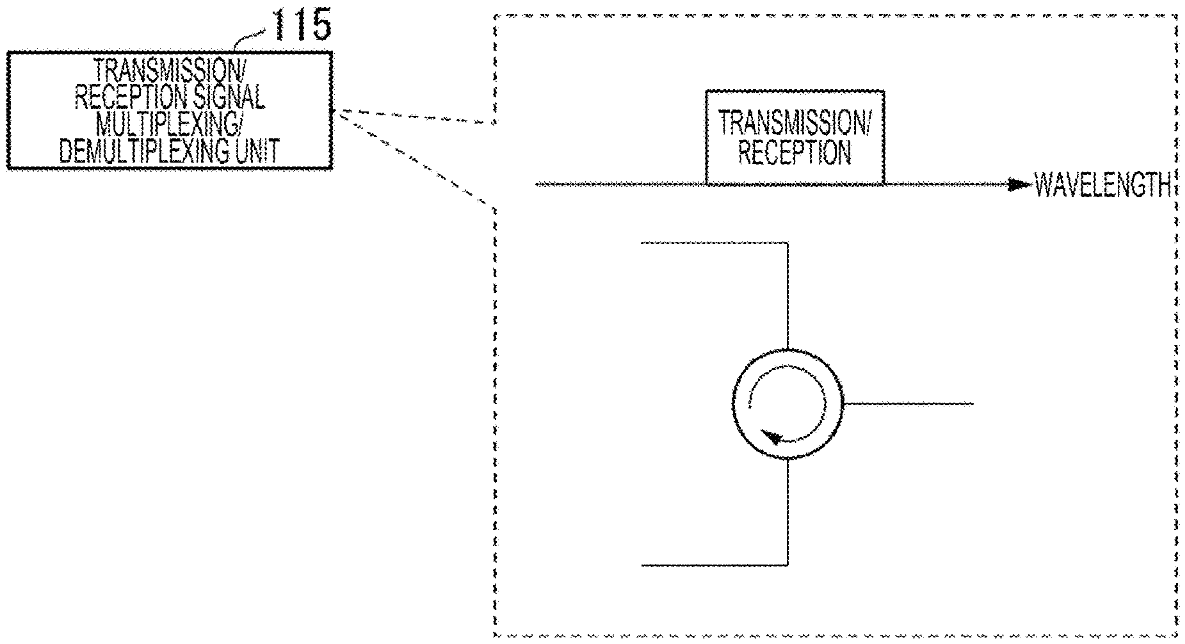
FIG. 14 is a second explanatory diagram for describing an example of details of a configuration of a transceiver in a modification.

FIG. 13 is a first explanatory diagram for describing an example of details of the configuration of the transceiver in the modification. FIG. 14 is a second explanatory diagram for describing an example of details of the configuration of the transceiver in the modification. More specifically, FIGS. 13 and 14 are explanatory diagrams for describing switching of transmission wavelengths in the example of FIG. 10, taking a case where the transceiver 101 is an optical transceiver that performs single-core bidirectional communication as an example.

FIG. 13 illustrates that signals may be multiplexed/demultiplexed by, for example, a wavelength filter in a case where transmission/reception wavelength bands are different in order to prevent signal interference of transmission/reception signals. FIG. 14 illustrates that, in a case where the transmission/reception signal wavelengths are not in different wavelength bands, the output port may be switched on the basis of, for example, directivity of the optical signal. A device that switches the output port on the basis of the directivity of the optical signal is, for example, a circulator.

Note that the configuration of the transceiver 101 may be a configuration in which the communication wavelength is switched at a high speed using a single general wavelength-tunable optical transmitter and receiver instead of the configuration of FIG. 10. In addition, the configuration of the transceiver 101 may be a configuration in which these transmitters are combined. The combination configuration may be used in a case where the communication wavelength, the communication partner, or the number of partners dynamically varies. Further, the transceiver 101 may be a two-core transceiver.

Note that the network (that is, the managed unit 10) between the transceiver 101 and the optical switch 102 in the configuration of FIG. 1 or 12 may be managed as one data center by an administrator. In such a case, the transceiver disposed in the gateway 103 that is an out-of-data center switch may be the same as the transceiver (that is, the transceiver 101) disposed in the data center. In addition, in a case where each port communicates with only a single partner at an arbitrary wavelength, the transceiver 101 may be a transceiver for an access point name (APN) connection that transmits and receives an arbitrary single wavelength.

Note that the optical switch 102 and the gateway 103 may be connected by one fiber through which a signal multiplexed using an arrayed waveguide grating (AWG) passes.

All or some of the functions of the management device 4 and the transceiver control device 5 may be implemented by using hardware such as an application specific integrated circuit (ASIC), a programmable logic device (PLD), or a field programmable gate array (FPGA). The program may be recorded on a computer-readable recording medium. The computer-readable recording medium is, for example, a portable medium such as a flexible disk, a magneto-optical disc, a ROM, or a CD-ROM or a storage device such as a hard disk built in a computer system. The program may be transmitted via an electrical communication line.

Although the embodiment of the present invention has been described in detail with reference to the drawings, the specific configuration is not limited to the embodiment, and includes design and the like within a range not departing from the gist of the present invention.

REFERENCE SIGNS LIST

100, 100*a* Signal transmission system
10 Managed unit
101, 101-1 to 101-M Transceiver
102 Optical switch
103 Gateway
104 Management unit
105 Transceiver control unit
31 Control unit
32 Communication unit
33 Storage unit
41 Control unit
42 Communication unit
43 Storage unit
411 Communication control unit
412 Storage control unit
51 Control unit
52 Communication unit
53 Storage unit
54 Control circuit
511 Communication control unit
512 Storage control unit
540-1, 540-2 Electrical switch
111 Optical transmitter
112 Multiplexing unit
113 Optical receiver
114 Wavelength demultiplexing unit
115 Transmission/reception signal multiplexing/demultiplexing unit
601, 602 End switch
401 First partial management unit
402 Second partial management unit
403 Third partial management unit
431 First partial storage unit
432 Second partial storage unit
501 First transceiver partial control device
502 Second transceiver partial control device
9 Network
91 Processor
92 Memory

93 Processor
94 Memory
95 Processor
96 Memory

The invention claimed is:

1. A signal transmission system comprising:

a plurality of transceivers that transmits and receives an optical signal;

a gateway that receives the optical signal transmitted by the transceiver, performs optical-electrical conversion and electrical-optical conversion for the received optical signal, and outputs the converted optical signal;

an optical switch that includes a port connected to the transceiver and a port connected to the gateway, and outputs the optical signal to a port corresponding to a wavelength of the optical signal input to the port;

a first processor;

a first storage medium having computer program instructions stored thereon, wherein the computer program instruction, when executed by the first processor, perform processing of:

determining the wavelength of the optical signal transmitted by the transceiver, and determining the wavelength of the optical signal to be transmitted by a transmission-scheduled transceiver that is the transceiver scheduled to transmit the optical signal according to a predetermined rule in a case of acquiring transmission schedule notification information indicating the transmission-scheduled transceiver; and a second processor;

a second storage medium having computer program instructions stored thereon, wherein the computer program instruction, when executed by the second processor, perform processing of:

controlling an operation of the transceiver;

causing the transmission-scheduled transceiver to transmit the optical signal of the determined wavelength, after the determination of the wavelength.

2. The signal transmission system according to claim 1, wherein the rule is a rule for determining, on the basis of first correspondence information that is information indicating a one-to-one relationship between each of the transceivers and the wavelength of the optical signal, the wavelength of the optical signal to be transmitted by the transmission-scheduled transceiver at the wavelength indicated by the first correspondence information.

3. The signal transmission system according to claim 1, wherein the rule is a rule for determining the wavelength on the basis of information indicating a transmission destination of the optical signal scheduled to be transmitted by the transmission-scheduled transceiver.

4. The signal transmission system according to claim 3, wherein the rule is a rule for determining, as the wavelength of the optical signal to be transmitted by the transmission-scheduled transceiver, a wavelength associated in advance with each set of the transmission-scheduled transceiver and the transmission destination of the optical signal scheduled to be transmitted by the transmission-scheduled transceiver.

5. The signal transmission system according to claim 3, wherein the rule is a rule for determining, as the wavelength of the optical signal to be transmitted by the transmission-scheduled transceiver, a wavelength associated in advance with each set of the transmission-scheduled transceiver, the transmission destination of the optical signal scheduled to be transmitted by the transmission-scheduled transceiver, and a packet amount of the optical signal.

6. The signal transmission system according to claim 1, wherein the computer program instruction stored in the first storage medium, when executed by the first processor, perform processing of:

determining the port to which the optical signal scheduled to be transmitted by the transmission-scheduled transceiver is input and the port from which the optical signal is output, in addition to the determination of the wavelength.

7. The signal transmission system according to claim 1, wherein the computer program instruction stored in the first storage medium, when executed by the first processor, perform processing of:

executing transmission satisfying a grouping transmission condition including a condition that a plurality of the transceivers is regrouped every predetermined unit time, a condition that signal transmission not via the gateway is performed only between the transceivers in each group during the unit time, and a condition that an arbitrary transceiver of the transceivers is connected to another transceiver of the transceivers at least once in a predetermined unit period T longer than the unit time.

8. A signal transmission method executed by a signal transmission system that includes a plurality of transceivers that transmits and receives an optical signal;

a gateway that receives the optical signal transmitted by the transceiver, performs optical-electrical conversion and electrical-optical conversion for the received optical signal, and outputs the converted optical signal;

an optical switch that includes a port connected to the transceiver and a port connected to the gateway, and outputs the optical signal to a port corresponding to a wavelength of the optical signal input to the port;

a first processor;

a first storage medium having computer program instructions stored thereon, wherein the computer program instruction, when executed by the first processor, perform processing of:

determining the wavelength of the optical signal transmitted by the transceiver, and determining the wavelength of the optical signal to be transmitted by a transmission-scheduled transceiver that is the transceiver scheduled to transmit the optical signal according to a predetermined rule in a case of acquiring transmission schedule notification information indicating the transmission-scheduled transceiver; and a second processor;

a second storage medium having computer program instructions stored thereon, wherein the computer program instruction, when executed by the second processor, perform processing of:

controlling an operation of the transceiver;

causing the transmission-scheduled transceiver to transmit the optical signal of the determined wavelength, after the determination of the wavelength, the signal transmission method comprising:

determining the wavelength of the optical signal to be transmitted by a transmission-scheduled transceiver that is the transceiver scheduled to transmit the optical signal according to a predetermined rule in a case of acquiring transmission schedule notification information indicating the transmission-scheduled transceiver; and causing, after the determination of the wavelength the transmission-scheduled transceiver to transmit the optical signal of the determined wavelength.

* * * * *